US005731680A

United States Patent [19]

Winterberger et al.

[11] Patent Number: 5,731,680

[45] Date of Patent: Mar. 24, 1998

[54] METHOD AND APPARATUS FOR REGISTERING A SHEET WITH AN IMAGE-BEARING MEMBER

[75] Inventors: John Andrew Winterberger; Thomas Richard Hull, both of Spencerport, N.Y.

[73] Assignee: Eastman Kodak Company, Rochester, N.Y.

[21] Appl. No.: 582,242

[22] Filed: Jan. 3, 1996

Related U.S. Application Data

[60] Provisional application No. 60/000,666 Jun. 29, 1995.

[51] Int. Cl.[6] .......... G05B 19/40

[52] U.S. Cl. .......... 318/685; 399/396; 400/902; 271/226

[58] Field of Search .......... 399/381, 388, 399/394, 396; 400/902, 903; 318/685, 696; 271/226

[56] References Cited

U.S. PATENT DOCUMENTS

| | | | |
|---|---|---|---|
| 4,591,969 | 5/1986 | Bloom et al. | 318/603 X |
| 5,126,764 | 6/1992 | Miyauchi et al. | 318/696 |
| 5,177,422 | 1/1993 | Kataoka et al. | 318/685 |
| 5,322,273 | 6/1994 | Rapkin et al. | 271/227 |

*Primary Examiner*—David S. Martin
*Attorney, Agent, or Firm*—Norman Rushefsky

[57] ABSTRACT

An apparatus and method for control of a stepper motor drive for controlling movement of a receiver sheet into transfer relationship with an image-bearing member that supports an image to be transferred to the receiver sheet. Initially, the stepper motor is driven by drive pulses generated in response to clock pulses not synched with movement of the member. However, in order to ensure accurate registration, stepper motor drive pulses are subsequently generated that are in sync with encoder clock pulses that are generated in response to movement of the member. The transition of generation of the drive pulses is determined by establishing a condition of concurrence of a non-synched stepper motor drive pulses with an edge of an encoder pulse. The term condition of concurrence may be established by generating a timing control pulse of relatively short pulse-width to define an allowed period for determining the condition of concurrence.

7 Claims, 8 Drawing Sheets

METHOD AND APPARATUS FOR REGISTERING A SHEET WITH AN IMAGE-BEARING MEMBER

CROSS REFERENCE TO RELATED APPLICATION

Reference is made to and priority claimed from U.S. Provisional application Ser. No. 60/000,666, filed 29 Jun. 1995, entitled METHOD AND APPARATUS FOR REGISTERING A SHEET WITH AN IMAGE-BEARING MEMBER.

BACKGROUND OF THE INVENTION

1. Field of the Invention

This invention relates to electrostatographic reproduction apparatus and methods for registering sheets and more particularly to apparatus and methods for control of a stepper motor drive for controlling movement of a receiver sheet into transfer relationship with an image bearing member that supports an image to be transferred to the receiver sheet.

2. Brief Description of the Prior Art

In the prior art of electrostatographic copier, printers or duplicators the problem of accurate registration of a receiver sheet with a moving member supporting an image for transfer to the sheet is well known. In this regard, reference is made to U.S. Pat. No. 5,322,273 the contents of which are incorporated herein by reference.

Typically, an electrostatic latent image is formed on the member and this image is toned and then transferred to a receiver sheet directly or transferred to an intermediate image bearing member and then to the receiver sheet. In moving of the receiver sheet into transfer relationship with the image bearing member, it is important to adjust the sheet for skew. Once the skew of the sheet is corrected, it is advanced by stepper motor-driven rollers towards the image bearing member. During adjustment for skew control, the adjustment occurs with selective drive of the stepper motor driven rollers which are controlled independently of movement of the image-bearing member. Typically, movement of the image bearing member and operations performed thereon by various operative stations are controlled using one or more encoders. In the prior art, it is known that for improved registration control an apparatus may have a transfer roller upon which an encoder wheel is mounted and this encoder used for controlling registration of the sheet. At some point in time after adjustment of the sheet for skew and prior to engagement of the sheet into transfer relationship with the image bearing member, the control of the stepper motors that provide the drive to the rollers which advance the sheet, is transferred from clock pulses of say a microprocessor to clocking pulses generated by the encoder wheel.

A problem with the prior art is that in switching control of the stepper motors from synchronization with control signals in the skew correction device to that of the encoder wheel a stepper motor driving pulse may be lost resulting in sufficient speed difference between receiver sheet and photoconductive belt that upon impact of the sheet with the belt stalling of the stepper motor could result. In any event, accurate registration is not accomplished. It is, therefore, an object of the invention to provide improved methods and apparatus for ensuring accurate registration of the receiver sheet and image bearing member.

SUMMARY OF THE INVENTION

In accordance with one aspect of the invention, there is provided an apparatus for advancing a sheet into registered relationship with a moving image-bearing member; said apparatus comprising a stepper motor that is responsive to stepper motor drive pulses; a drive member in engagement with the sheet; a drive coupling connecting the stepper motor and the drive member; an encoder that generates first clock pulses that correspond with movement of the image-bearing member; a generator of stepper motor drive pulses; a source of second clock pulses that is connected to the generator, the second clock pulses being generated independently of the first clock pulses; the generator being connected to the stepper motor for generating first stepper motor drive pulses in response to the second clock pulses for advancing the sheet to a speed approximately the same as the image-bearing member; means responsive to one of said first stepper motor drive pulses or the first clock pulses for generating a timing control pulse having a time duration; and means, responsive to occurrence of a portion of one of the first clock pulses or the first stepper motor drive pulses during the time duration of a timing control pulse for generating a signal; means responsive to said signal and generating second stepper motor drive pulses in response to the first clock pulses for driving the stepper motor to advance the sheet into registered relationship with the image-bearing member.

In accordance with another aspect of the invention, there is provided a method for advancing a sheet into registered relationship with a moving image-bearing member using, a stepper motor that is responsive to stepper motor drive pulses and drives a drive member in engagement with the sheet; said method comprising generating first clock pulses that correspond with movement of the image-bearing member; generating stepper motor drive pulses that are generated independently of the fast clock pulses for advancing the sheet to a speed approximately the same as the image-bearing member in response to one of said first stepper motor drive pulses or the first clock pulses generating a timing control pulse having a time duration; in response to occurrence of at least a portion of one of the first stepper motor drive pulses or a portion of one of the first clock pulses during the time duration of a timing control pulse generating a signal; in response to said signal generating second stepper motor drive pulses in response to the first clock pulses for driving the stepper motor to advance the sheet into registered relationship with the image-bearing member.

The invention and its various advantages will become more apparent to those skilled in the art from the ensuing detailed description of preferred embodiments, reference being made to the accompanying drawings.

BRIEF DESCRIPTION OF THE DRAWINGS

The subsequent description of the preferred embodiments of the present invention refers to the attached drawings, wherein.

DESCRIPTION OF PREFERRED EMBODIMENT

Because electrostatographic reproduction apparatus are well known, the present description will be directed in particular to elements forming part of or cooperating more directly with the present invention. Apparatus not specifically shown or described herein are selectable from those known in the prior art.

Figure 1:
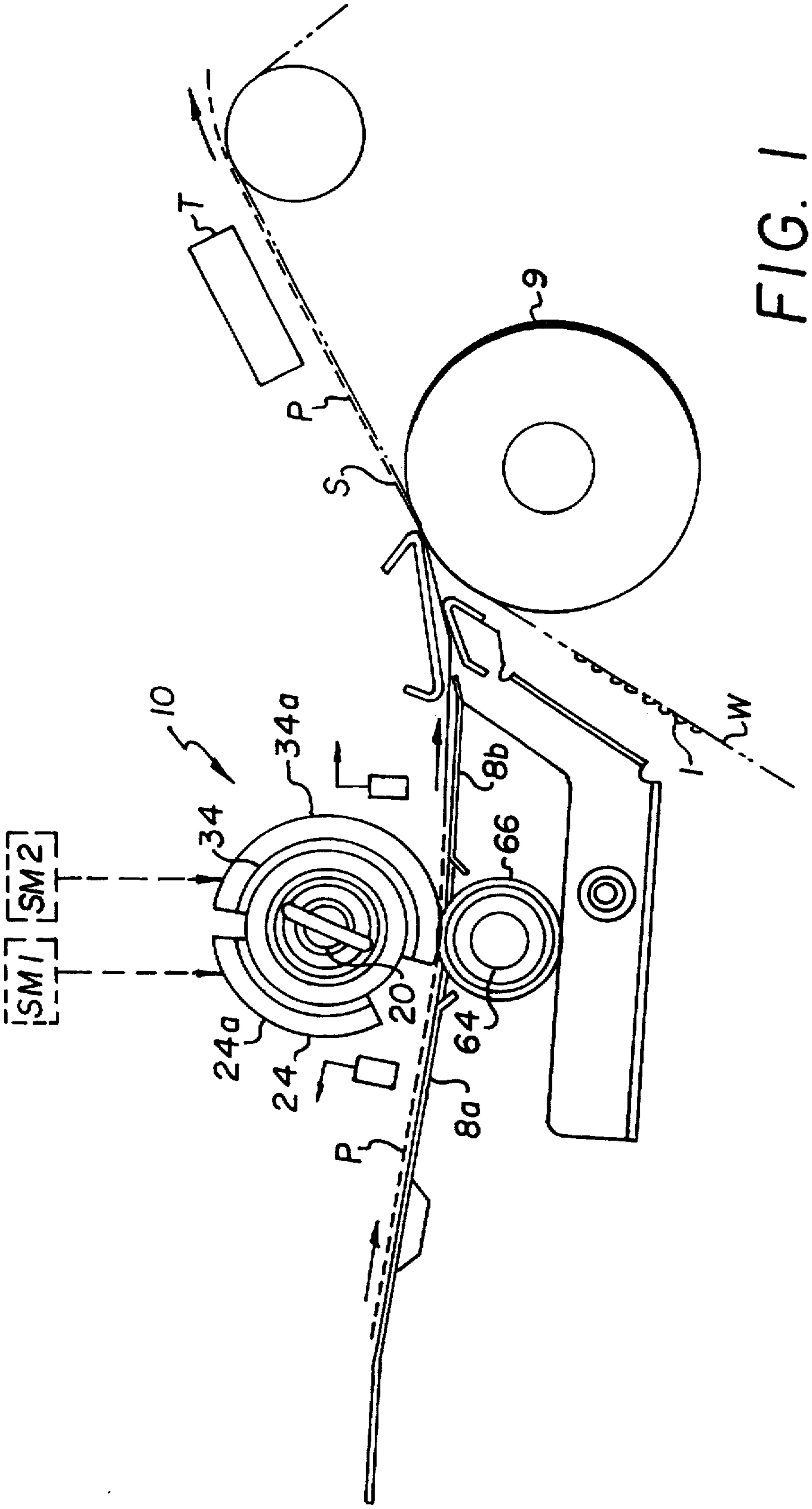
FIG. 1 (PRIOR ART)
FIG. 1 is a side elevational view of a sheet registration mechanism of the prior art and which may form a part of the apparatus and method of the invention.

Referring now to the accompanying drawings, FIG. 1 illustrates a sheet registration mechanism, designated generally by the numeral 10, according to the prior art. The sheet registration mechanism 10 is located in association with a substantially planar sheet transport path P of any well known device where sheets are transported seriatim from a supply (not shown) to a station where an operation is performed on the respective sheets. For example, the device may be a reproduction apparatus such as a copier or printer or the like where marking particle developed images of original information are placed on receiver sheets. As shown in FIG. 1, the marking particle developed images (e.g., image I) are transferred at a transfer station T from a movable web or drum (e.g., web W) to a sheet of receiver material (e.g., a cut sheet S of plain paper or transparency material) moving along the path P over support surfaces **8*a*, 8*b***.

In reproduction apparatus of the type, it is desired that the sheet S be properly registered with respect to a marking particle developed image in order for the image to be placed on the sheet in an orientation to form a suitable reproduction for user acceptability. Accordingly, the sheet registration mechanism 10 provides for alignment of the receiver sheet in a plurality of orthogonal directions. That is, the sheet is aligned, with the marking particle developed image, by the sheet registration mechanism by removing any skew in the sheet (angular deviation relative to the image) and moving the sheet in a cross-track direction so that the centerline of the sheet in a cross-track direction of sheet travel and the centerline of the marking particle image are coincident. Further, the sheet registration mechanism 10 times the advancement of the sheet along the path P such that the sheet and the marking particle image are aligned in the in-track direction as the sheet travels through the transfer station T adjacent a transfer roller 9 which guides the web W.

In order to accomplish skew correction and cross-track and in-track alignment of the sheet, for example, with respect to a marking particle developed image on the moving photoconductive web W, the sheet registration apparatus 10 includes first, second and third independently driven roller assemblies. The roller assemblies are axially aligned with the axis of shaft 20 shown in FIG. 1. The first and second roller assemblies are located outboard of the third roller assembly and to either side thereof. As noted in more detail in U.S. Pat. No. 5,322,273, the first and second roller assemblies have segments **24*a*, 34*a* that are adapted to engage a sheet S positioned within a nip formed also with respective backup rollers, only one of which 66 is shown, and which are mounted on a shaft 64. The driver rollers 24, 34** function at first independently to correct skew and then are disabled for a period. After the period, drive to the first and second drive roller assemblies is again made and the sheet's speed is ramped-up so that it is substantially that of the moving web W based on either assumption of what that speed should be or calculations of actual speed as measured by suitable known means. The first and second rollers assemblies continue to transport the sheet along the transport path P at a speed substantially equal to the speed of the web W until the lead edge touches down on the web, in register with the image I carried by the web. Prior to the lead edge touching down on the web cross-track registration is provided by the third roller assembly which is adapted to provide driving movement of the sheet in a cross-track direction to correct the position of the sheet for proper cross-track registration; i.e., shifting the sheet in a direction perpendicular to the plane of FIG. 1.

As noted above, a problem with the registration control mechanism of the prior art is that control of the stepper motors drive during ramping-up of the speed of the sheet is not synchronized with exact movement of the web. Since the web speed changes, improved registration requires that control of the drive to the sheet be synchronized with the movement of the web.

Figure 2:
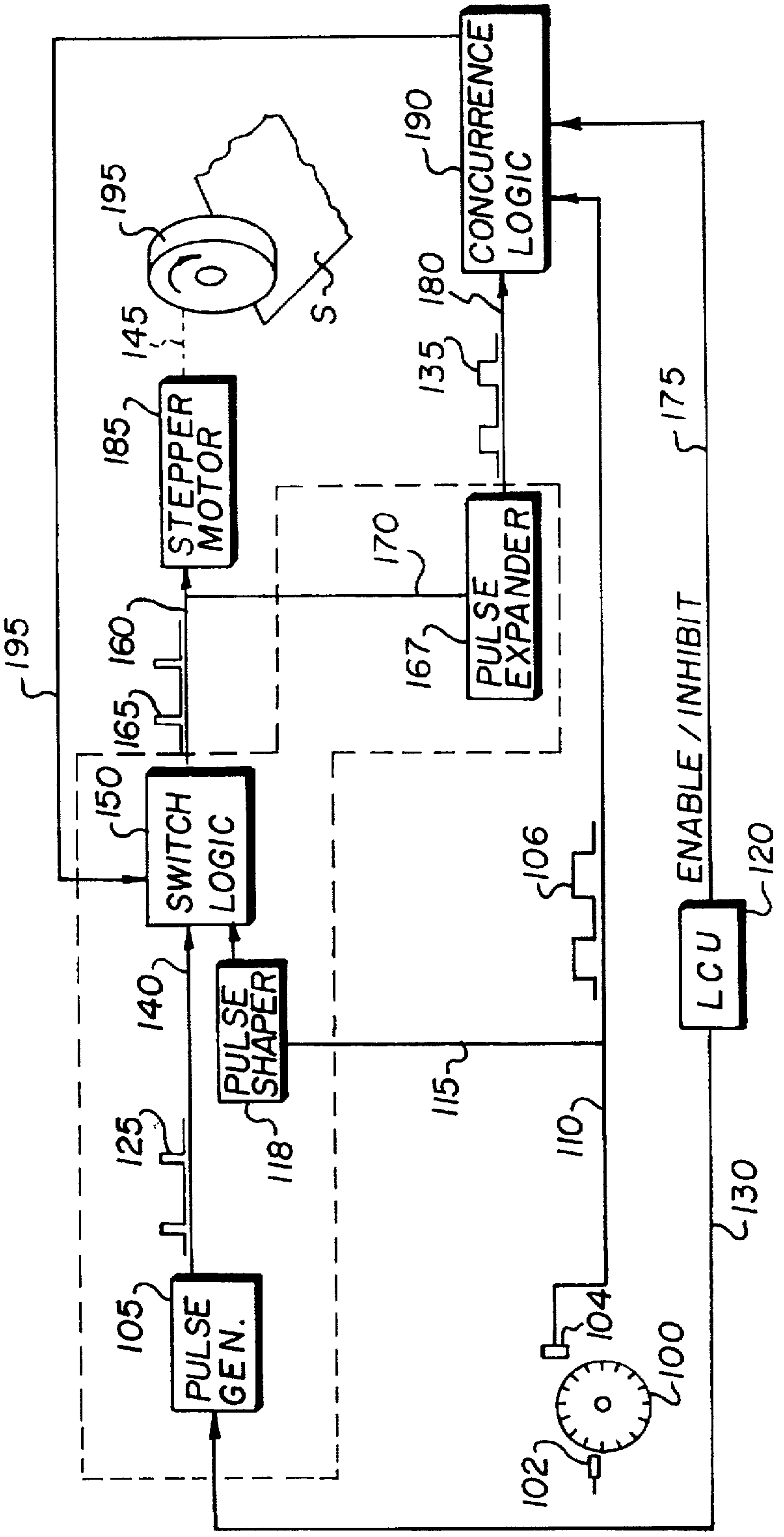
FIG. 2 is a schematic of a circuit for controlling one or more stepper motors in accordance with one embodiment of the invention.
Figure 3:
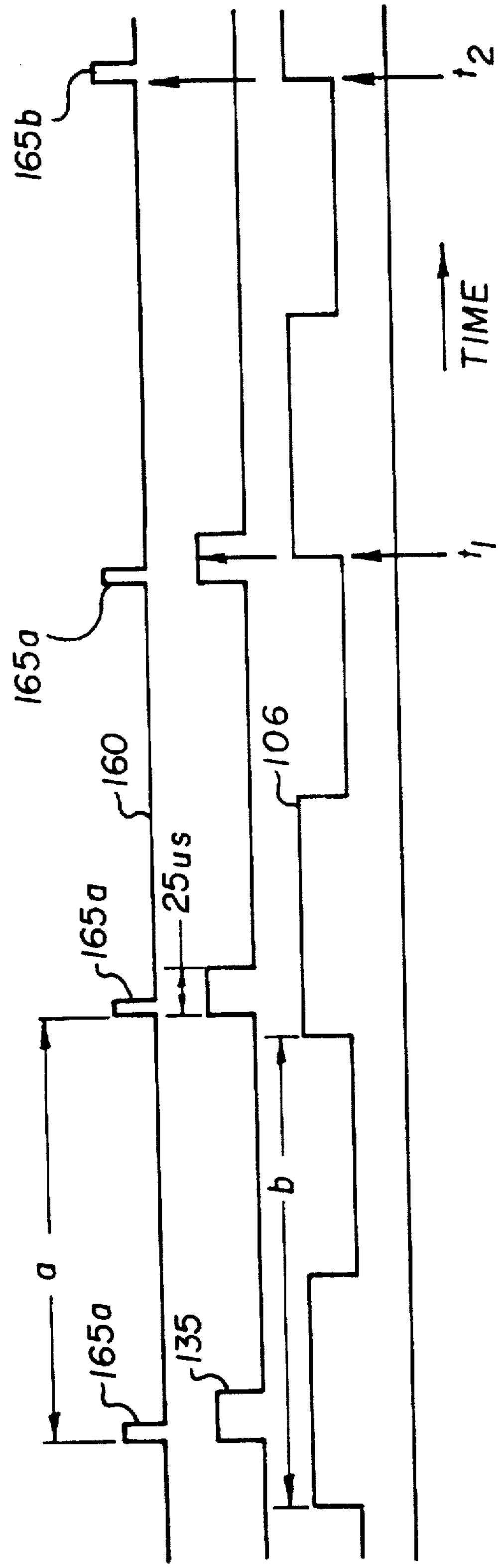
FIG. 3 is a timing diagram illustrating various pulses generated in the circuit of FIG. 2.

With reference to FIG. 2, a schematic of one form of a stepper motor controller for use in the apparatus and method of the invention is illustrated. An encoder wheel 100 is provided that is associated with the transfer roller 9 and as the roller rotates the indicia on the encoder wheel move and interrupt light from a light source 102 which light or absence of same is sensed by a phototransducer 104. Other forms of encoders that use magnetic indicia or are linear rather than rotating may be used since the encoder details are not critical to the invention. Electrical pulses 106 are generated by the phototransducer on line 110 and these pulses are synchronized with movement of the photoconductive image-bearing member. Assume that skew correction of the sheet to receive an image has occurred. The logic and control unit LCU 120 which may be a microprocessor (μp) commences a programmed control over lines 130 of a programmable pulse generator 105 that generates a series of evenly spaced stepper motor pulses 125 over a line 140. A logic switch 150 is enabled to effectively pass the pulses 125 onto output line 160 as pulses 165 which are input to the stepper motor 185. The stepper motor 185 is mechanically coupled by a mechanical drive connection to a drive roller 195 that is in engagement with the receiver sheet S. A second stepper motor (not shown) is similarly connected to a second drive roller (not shown) for providing similar drive to the sheet S. The programmed drive of the stepper motors, as will be more fully described below, is provided to drive the sheet so that it attains a speed approximate to that of the image-bearing member. A third stepper motor (not shown) is provided for driving the third roller assembly for obtaining cross-track registration as noted above. Preferably, as may be seen in FIG. 3, the stepper motor drive pulses **165*a* to stepper motor 185 are generated so that the period "a" between rising edges of pulses 165*a* is slightly shorter, say by 20 μs, than the period "b" between rising edges of encoder pulses 106. While the approximate rate of generation of encoder pulses is predictable, the precise time of when an encoder pulse will be generated is not known. To determine this time with reasonable accuracy so that a switching over can be made from a drive mode of the stepper motor 185 that is nonsynchronized with the encoder to a drive mode that is synchronized with the encoder, the invention provides for a means for detection of a concurrence of the rising edges of the encoder pulse and the (nonsynchronized with the encoder) stepper motor pulses. As used herein, the term "concurrence" implies that events do not necessarily occur at exactly the same time but such events occur during a predetermined time period that is relatively small as compared to a period between stepper motor pulses. One example in accordance with the invention for detecting concurrence of nonsynchronized stepper motor pulses 165*a* with encoder pulses is by generating pulses 135 using a pulse expander or pulse generator shaper 167 so that pulses of a predetermined period, say 25 μs, and which are synchronized with the stepper motor pulses; i.e., each pulse 135 is generated in response to a rising edge of a stepper motor pulse 165. Pulses 135 are desirably provided because the stepper motor pulses 165 are typically narrower than practical to achieve a state of concurrence with rising edges of relatively broad encoder pulses. The invention in its broader aspects contemplates that if the stepper motor drive pulses 165 are sufficiently wide for purposes for determining concurrence of a rising edge of an encoder pulse that they may be used in lieu of the need for pulses 135 for input to a concurrence logic detector 190 which detects concurrence between two pulses input thereto. The concurrence logic device 190 has as its inputs encoder pulses 106 on line 110 and the concurrence determining pulse 135 on line 180. The LCU 120 inhibits operation of the concurrence logic device during skew correction through a control signal provided on line 175. However, after appropriate correction operations are performed on the sheet and the sheet is speeded-up so that it matches that of the web W, the inhibit is removed and the device 190 is now enabled to detect concurrence of an encoder pulse 106 and pulse 135. At a concurrence event such as at time $t_1$ in FIG. 3, a signal is generated by the concurrence detector 190 on line 195 so that the switch logic 150 now generates the subsequent stepper motor pulses 165*b* and pulses thereafter on line 160 that are synchronized with the encoder pulses. Generation of stepper motor pulses that are synchronized with the encoder may be provided by having a pulse shaper or generator 118 that has an input line 115 connected to sense encoder pulses on line 110. The pulse shaper 118 responds to a rising edge of each encoder pulse and outputs through the switch logic 150 appropriately shaped stepper motor drive pulses 165** that continue to drive the stepper motors that drive the rollers into appropriate registered engagement with the image I on the web.

In a preferred specific implementation of the invention, the various elements shown within the dotted outline may be combined in a single device such as a programmed timer. An example of a specific implementation will now be discussed with reference to the circuit of FIG. 4 and the flowchart of FIGS. 5A and 5B.

Figure 4:
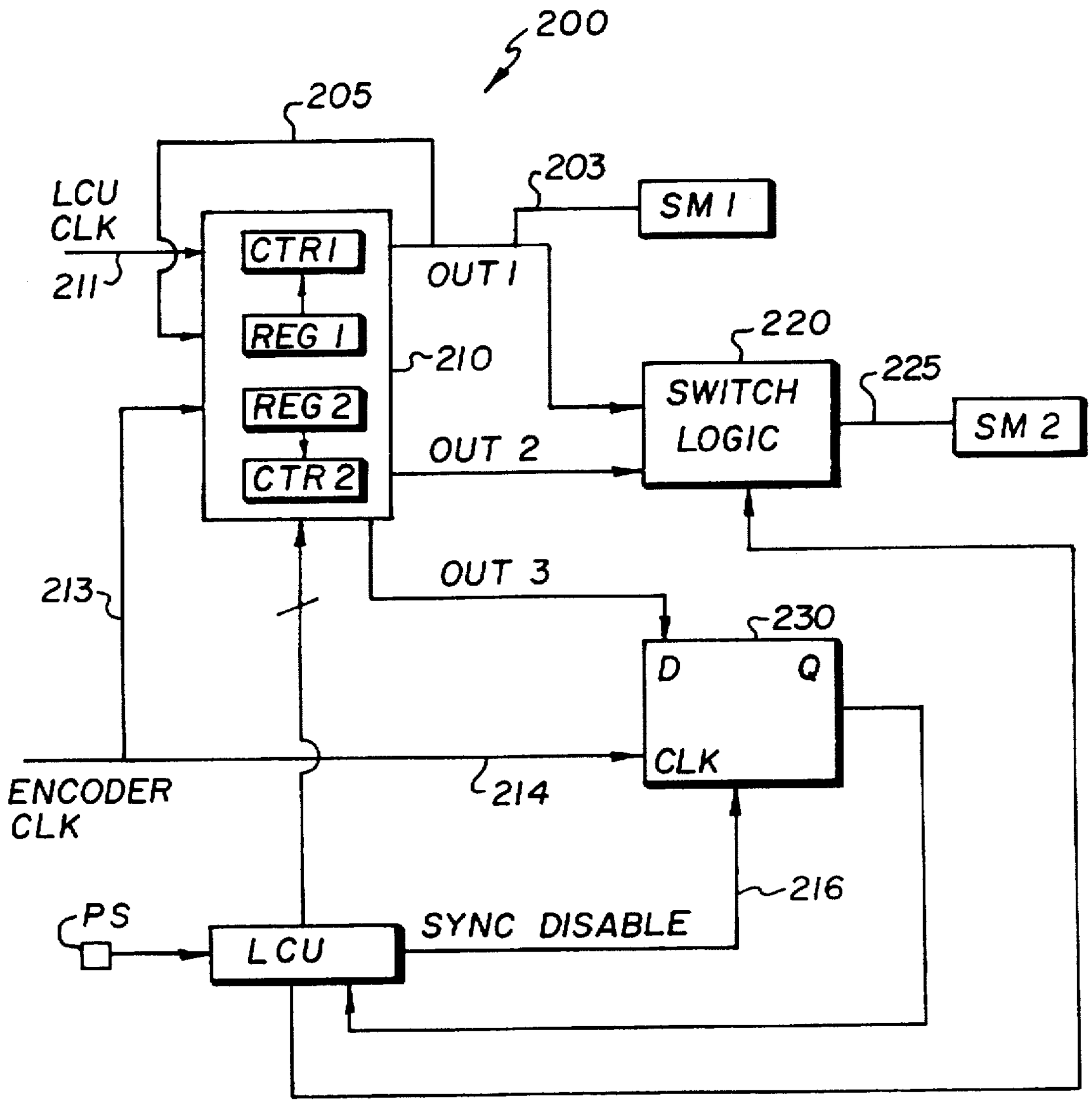
FIG. 4 is a schematic of a second circuit for controlling stepper motors in accordance with a second embodiment of the invention.
Figure 5A:
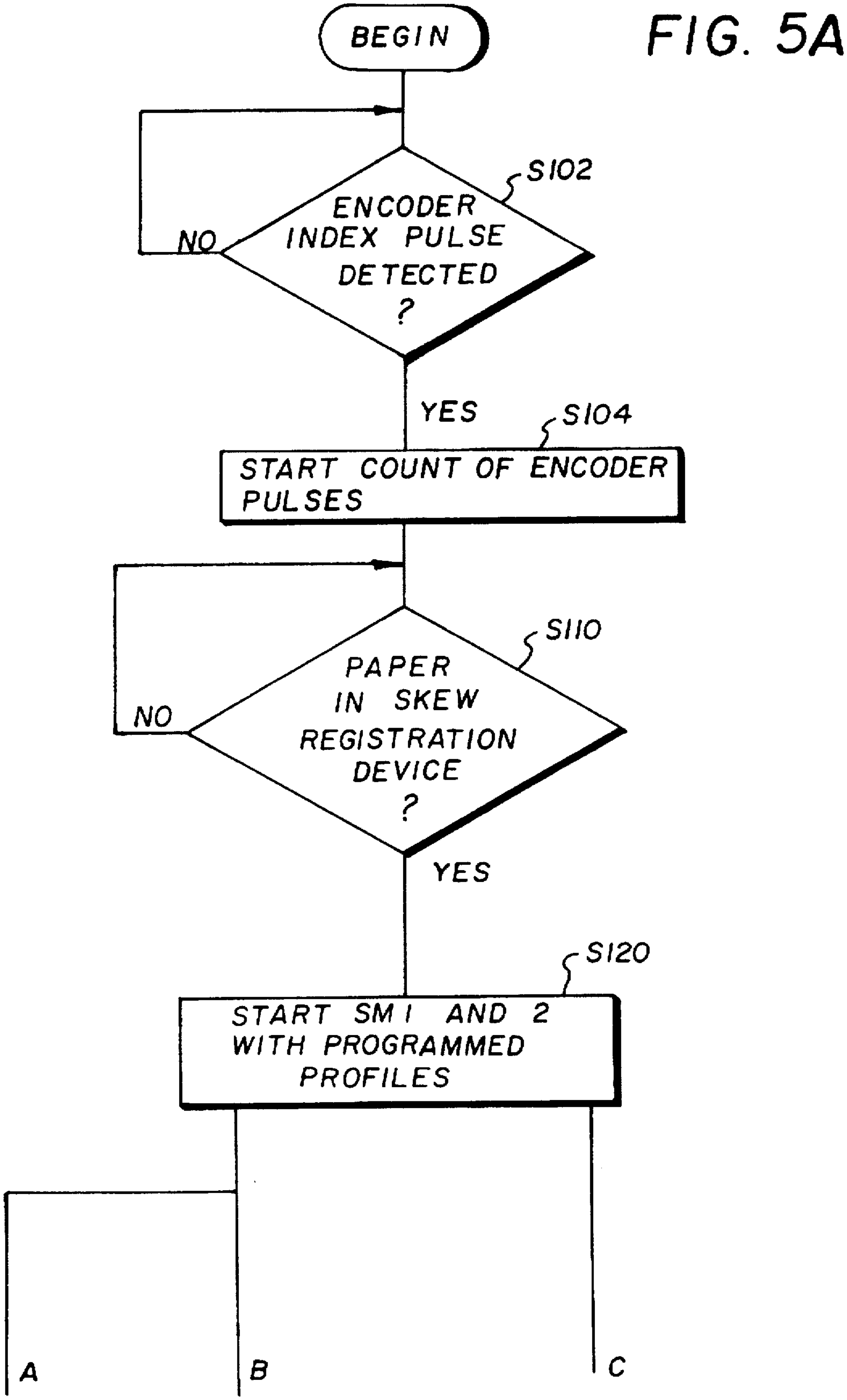
FIGS. 5A–5D is a flowchart describing operation of the circuit of FIG. 4.
Figure 5B:
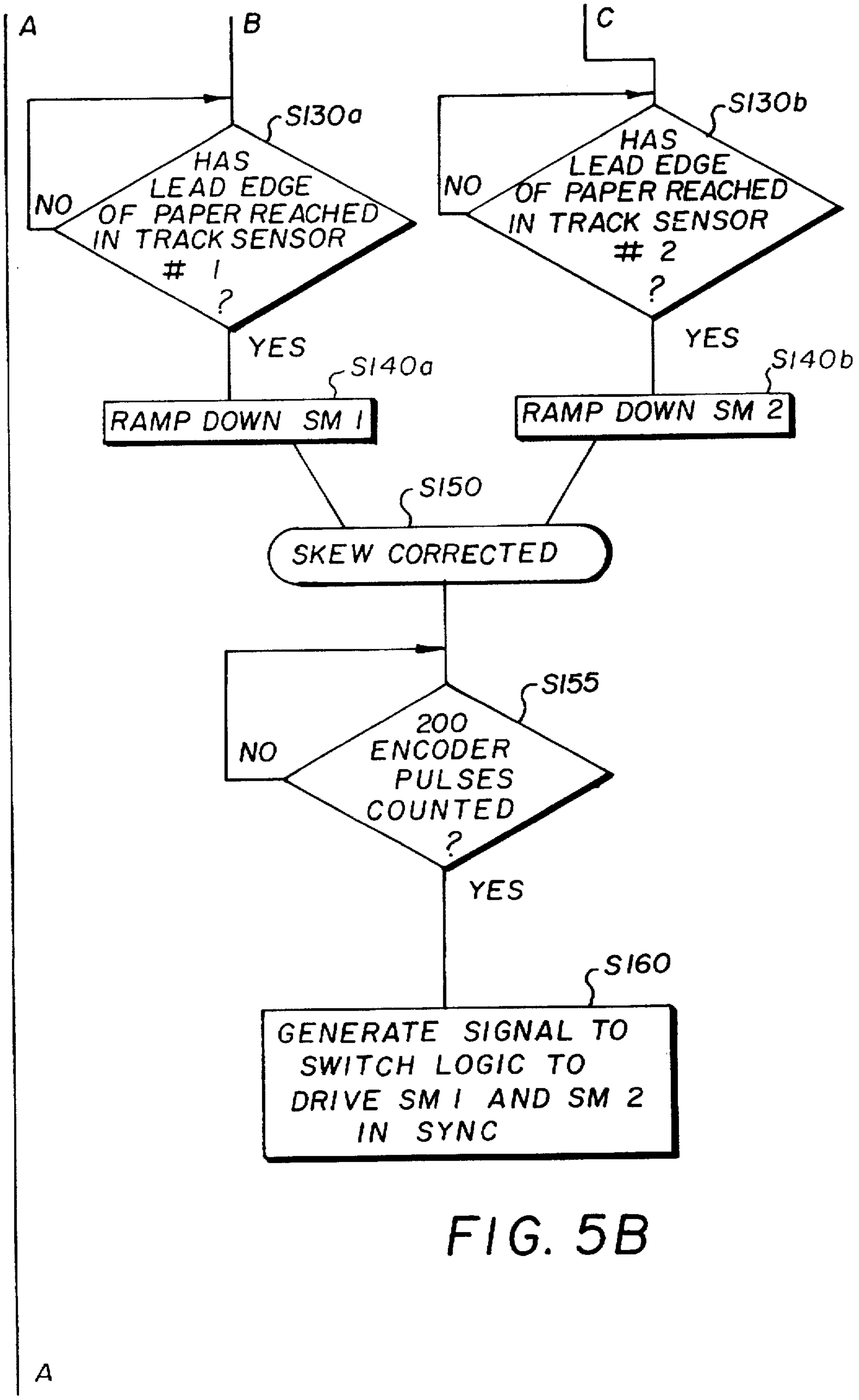
Figure 5C:
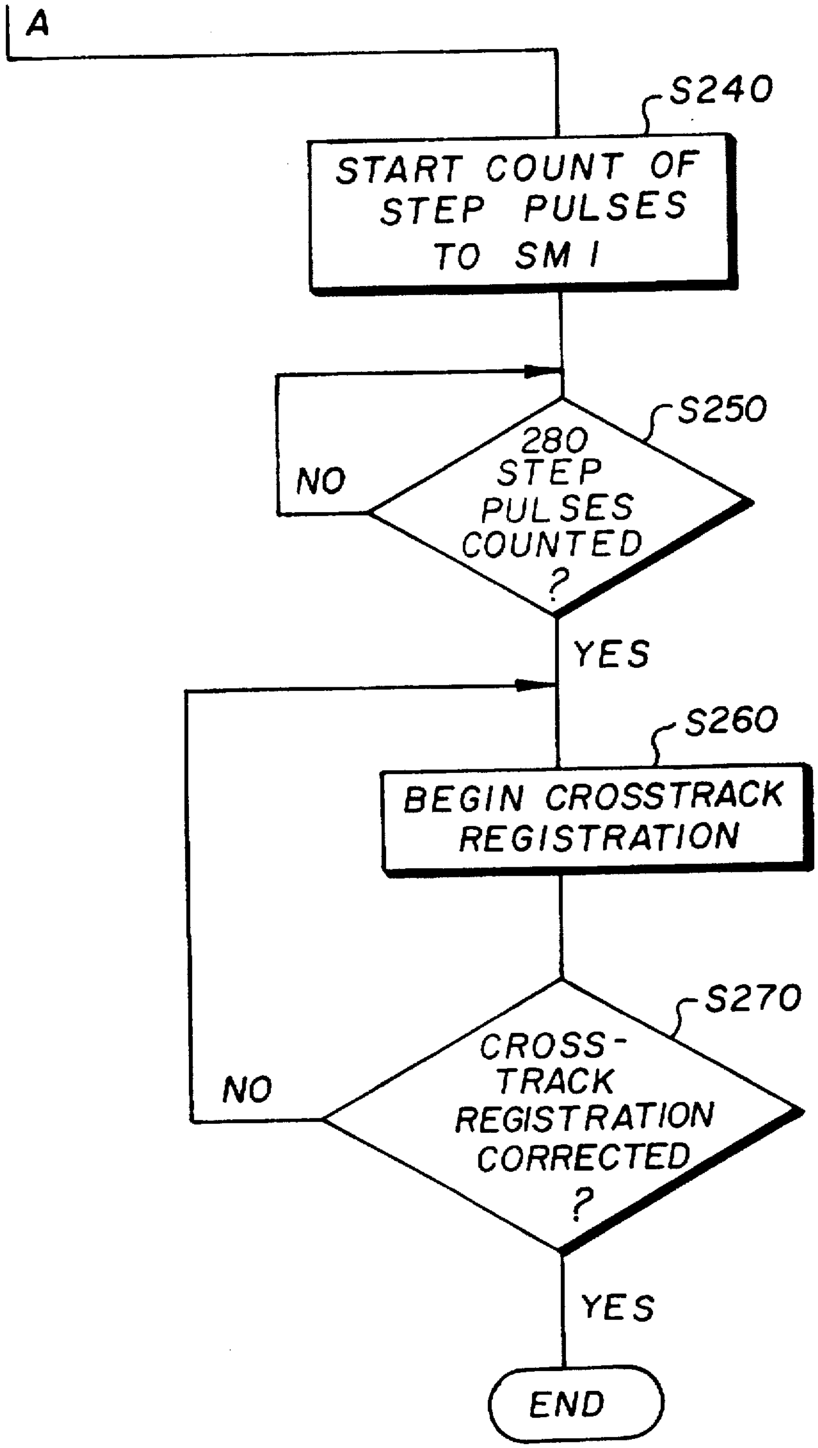
Figure 5D:
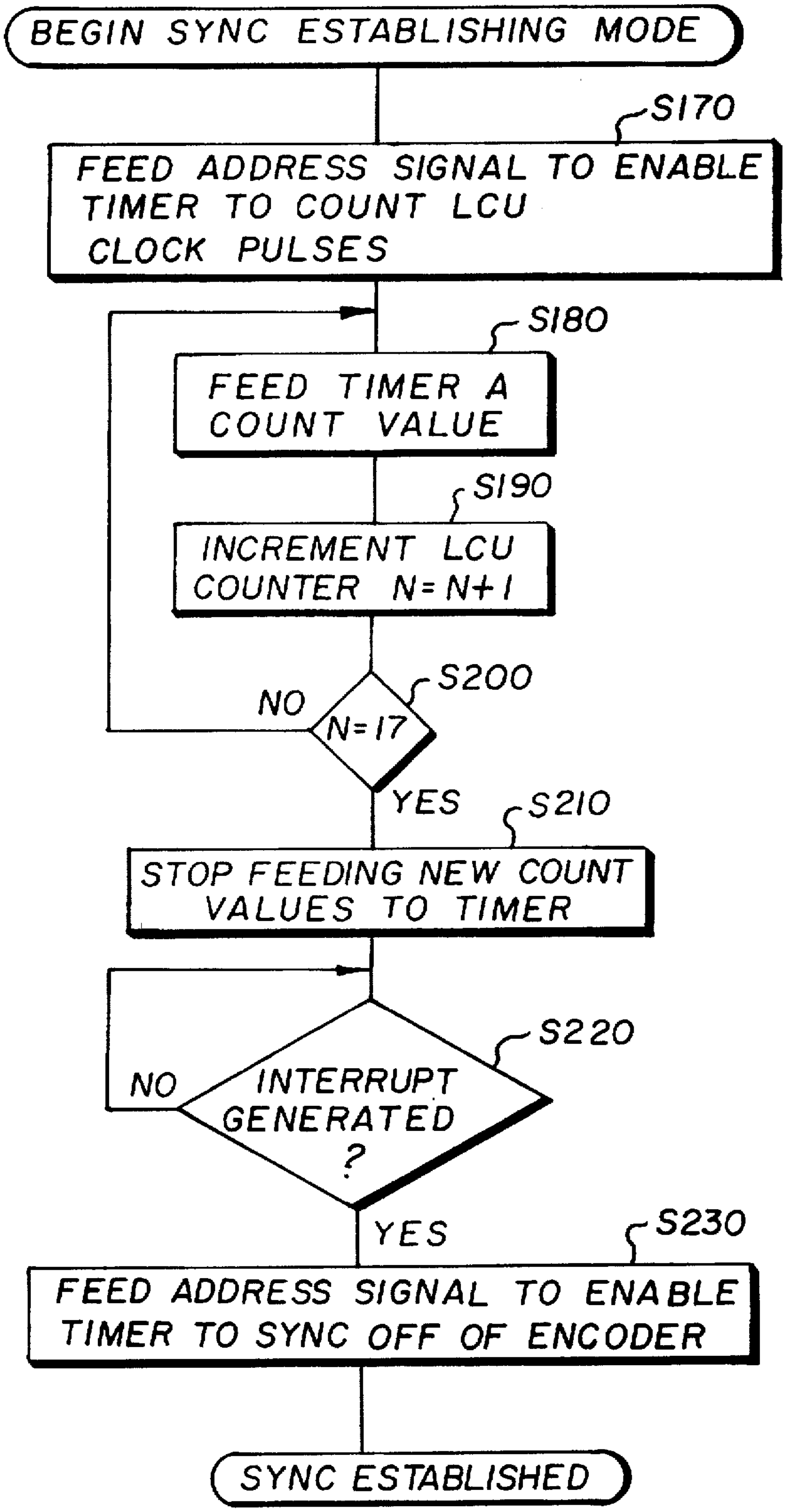

With reference now to FIG. 4, there is shown a schematic of a preferred embodiment of my invention wherein a stepper motor control apparatus 200 includes a programmable timer 210, such as a 9513 System Timing Controller manufactured by Advanced Micro Devices. Three output lines, Out 1, Out 2, Out 3 are associated with the timer. Line Out 1 is connected to a drive input of stepper motor SM1 via line 203 and to an input of a switch logic device 220. Line Out 1 is also connected to a feedback line 205 which feeds back a signal on line Out 1 to an input of timer 210. Line Out 2 is also connected to the switch logic device 220. The device 220 is adapted to selectively switch stepper motor drive pulses input thereto on lines Out 1 and Out 2 to an output line 225 of the device 220 that is in turn connected to a drive input of stepper motor SM2. The selection of the output that appears on line 225 is controlled by a signal from a logic and control unit (LCU) such as a microprocessor (μp). The LCU includes a central processing unit, memory and various attendant input/output devices for communicating control data and clock signals to the timer 210, switch logic 220 and a flip-flop 230. The flip-flop 230 is connected at a data input thereof to output line Out 3 of the timer 210. The timer includes at its input a line 211 that provides high speed clock pulses from a clock on the LCU. An additional input to the timer is from a line 213 which receiver encoder clock pulses that are generated in synchronism with rotation of the transfer roller 9 as described above. The encoder clock pulses 106 on line 214 are also input to a clock input of the flip-flop 230. In response to presence of a rising edge clock pulse on line 214 and a high level digital signal on line Out 3, the flip-flop will switch its Q output and this output is connected to the LCU. The LCU is also connected via line 216 to an enable input of the flip-flop to inhibit operation thereof until enabled by the LCU.

The timer includes a first register (REG1) and a first counter (CTR1) that is associated with the register. In order to generate stepper motor pulses that are spaced at programmed intervals, it is known to provide a programmed count value that is stored in a counter. The counter then counts high speed clock pulses and when it matches the count, a single stepper motor drive pulse is generated. Typically, the counts may work by downcounting the number of clock pulses starting with the count value until zero is reached before emitting the stepper motor drive pulse. A new count value is then loaded into the counter from the associated register which in turn receives the count from the LCU. The counting process repeats for generating the next stepper motor drive pulse. By changing the count values a programmed series of stepper motor drive pulses may be generated at non-uniform intervals. Uniform intervals of stepper motor drive pulses may be provided by either retaining the same count value in the counter or the register or continually reloading the same count value from the LCU to the associated register which stores the count value and is used to load or preset the counter. The programmable counter (CTR1) is responsive to clock pulses from the LCU on line 211. The series of stepper motor drive pulses generated by the counter (CTR1) are generated on line Out 1. A second register (REG2) and second programmable counter (CTR2) are also provided for counting clock pulses on line 211 and as register (REG2) can be loaded with different count values by the LCU, the stepper motor pulses generated by the second counter (CTR2) may be of different spacing when output on line Out 2 from those output on line Out 1. The LCU controls the timer 210 by providing the clock pulses, count values and a control signal that enables switching of the timer 210 from outputting stepper motor drive pulses synchronized with the LCU clock to outputting stepper motor drive pulses synchronized with encoder clock pulses on line 213. In generating stepper motor drive pulses synchronized with encoder clock pulses the timer 210 is set in a mode wherein each rising edge of an encoder clock pulse on line 213 generates on an output line, say Out 1, a corresponding stepper motor drive pulse. The timing of switching over from generation of stepper motor drive pulses synchronized with the LCU clock and those synchronized with the encoder clock will now be discussed with reference also to FIG. 3 and the flowcharts of FIGS. 5 and 6.

Initially, an encoder index pulse is detected (step S102) and a count is commenced (S104) of encoder pulses in a counter associated with the LCU. In step S110, the receiver sheet has been transported or fed into the skew registration device 10 and a determination is made in response to photosensors (PS) as to whether or not the sheet is detected. Upon detection of a sheet, the two stepper motors SM1 and SM2 are activated to run in accordance with programmed profiles (step S120). As described above, the stepper motor may be run with a controlled profile by having the LCU input different count values into registers provided in the programmable timer 210. When a count value is loaded into the timer's counter register, a counter in the timer counts the LCU's high frequency clock pulses and decrements the count in the register. Upon the count in the register reaching zero, an output pulse is provided on output line Out 1 which serves as a pulse to drive the stepper motor. At this time, a new count may be then loaded into the register. As this is repeated, a controlled series of stepper motor drive pulses at predetermined time spacings may be generated by selecting the individual count values that are placed in the register through signals from the LCU. Other means for generating non-uniformly spaced pulses are known for example a shift register may be provided with a programmed series of digital ones and zeros as data and the LCU, for example, may generate clock pulses that are used to shift the data from the register onto the shift register's output line that is connected to the stepper motor. The digital one values, for example, may serves as stepper motor drive pulses.

The LCU is programmed to load serially into each of the registers a predetermined set of digital numbers representing count values. These numbers may be serially loaded into each register which is known to activate each stepper motor to provide a drive profile that will cause a receiver sheet to be advanced within the registration device. Initially, each stepper motor is driven independently of the other with stepper motor SM1 being driven by pulses on the timer's output line Out 1 to which SM1 is connected. The output on line Out 1 is generated by pulses produced by the counter (CTR1) that is programmed with count values stored in the register (REG1). Similarly, SM2 is driven by step pulses on the timer's output line SM2 to which SM2 is connected. The output on line Out 2 is generated by pulses produced by the counter (CTR2) that is programmed with count values stored in the register (REG2).

Photodetector sensors (PS) are located downstream of each of the driver rollers that are driven by a respective stepper motor. When the lead edge of the receiver sheet is detected by a respective sensor, a signal is generated to the LCU (STEPS S130*a*, S130*b*). In response to this signal, a set of programmed count values is then serially placed in the appropriate timing register to cause a series of pulses on that stepper motors drive line, i.e., either Out 1 or Out 2 to cause a ramp down speed profile effect to be generated to stop the respective stepper motor (step S140*a*, S140*b*). When both stepper motors are stopped, the sheet has been corrected for skew (step S150) At this time, the LCU would be expected to complete its count initiated in step S104 of counting 200 encoder pulses (S155). When such count is completed, the LCU generates an address signal to the logic switching device 220 that switches the line Out 1 to be commonly connected to the drive inputs of both SM1 and SM2 (step 160). The LCU now also provides the timer 210 with an address control signal to have the timer again enter a mode wherein the timer counts LCU clock pulses. In this sync-establishing mode, the LCU is programmed to serially provide to the register (REG1) a series of 17 count values that are predetermined to have the counter (CTR1) generate step pulses that drive both SM1 and SM2 to advance the sheet to a speed that is approximately that of the photoconductive web (steps S170–200). When the seventeenth count value is placed in the register, this count value is retained causing the timer to generate a series of uniformly spaced stepper motor drive pulses since the counter is continually downcounting the count of LCU clock pulses starting at the same count value and emitting a stepper motor drive pulse when reaching zero (step S210). Thus, SM1 and SM2 continue to be driven by pulses 165*a* which have about a 20 μs shorter spacing ("a" in FIG. 3) than the spacing between rising edges of encoder pulses ("b" in FIG. 3). These pulses 165*a* are sufficient to continue to maintain a speed of the sheet that approximates that of movement of the image I on the photoconductive web.

In the sync-establishing mode, the LCU provides a signal on line 216 to enable the flip-flop 230 that has its clock input connected to line 214 to receive film encoder generated clock pulses associated with rotation of the transfer roller. The D input of the flip flop is connected to the timers output line Out 3. The signal on Out 3 is a series of 25 μs wide pulses 135 that are each synchronized with a rising edge of a stepper motor drive pulse provided on line Out 1. To generate these 25 μs wide timing control pulses, the output on line Out 1 is connected to an input gate of the timer by line 205. With enabling of the flip-flop, an output pulse will be generated by the flip-flop when a rising edge of an encoder pulse clock 106 on line 214 coincides with a pulse 135 on line Out3; see FIG. 3 at time $t_1$. The output generated by the flip-flop at time $t_1$ is an interrupt signal that is communicated to the LCU which is programmed (step S220) to respond to this signal and generate an address signal (step S230) to the timer 210 that enables the timer to respond to the rising edge of the next following encoder clock pulse as well as succeeding encoder clock pulses which pulses are input to the timer over line 213. In response to each such encoder clock pulse, there is provided a stepper motor drive pulse 165*b* to the stepper motors SM1, SM2 which are both connected to output line Out1 by the switch logic 220. Thus, the drives for the stepper motors SM1, SM2 are now synchronized to the encoder with the receiver sheet moving at a speed that is substantially that of the photoconductive web. Importantly, the synchronizing of the switching between running of the stepper motors SM1 and SM2 synchronized to that of the clock pulses of the LCU and then to that of rising edges of the encoder clock pulses is that such switching over occurs at a time when the last stepper pulse motor drive that is synched with the LCU clock is "concurrent" with the rising edge of the encoder pulse. This implies that the next stepper motor drive pulse at time $t_2$ which is generated directly in sync with the rising edge of the encoder pulse will be sufficiently spaced from the prior stepper motor drive pulse so that the speed profile of the receiver sheet is predictable and consistent and thus errors in registration are thereby substantially minimized.

Cross-track registration is provided for along an independent logic flow path. As may be seen in step S240, a count is commenced of step pulses to stepper motor SM1. When 280 step pulses are counted (step S250) drive by a third stepper motor to the third drive roller assembly is provided to begin cross-track registration (step S260). This typically would be expected to occur after step S220. Correction of cross-track registration (steps S270) would be completed prior to the sheet engaging the photoconductive web.

In a modification of the method and apparatus, the line 205 may be eliminated and the line Out 3 connected with Out 1 so that a concurrence between a portion of a stepper motor pulse generated in sync with the LCU clock and a portion of an encoder pulse, preferably an edge portion, generates a signal that is output by the flip-flop 230 to the LCU and causes the LCU to address the timer 210 so that the timer now responds to encoder pulses on line 213 to generate stepper motor drive pulses with each rising edge of an encoder pulse.

In another modification, an encoder pulse such as a rising edge thereof may be used to generate the timing control pulse and then a condition of concurrence determined between the rising edges of the encoder pulses and any portion of a stepper motor drive pulse.

Although the invention is described with specific reference to electrostatographic apparatus and methods, the invention has broader applicability to other fields wherein registration of a moving sheet is to be made with an image bearing member.

The invention has been described in detail with particular reference to preferred embodiments thereof and illustrative examples, but it will be understood that variations and modifications can be effected within the spirit and scope of the invention.

What is claimed:

1. An apparatus for advancing a sheet into registered relationship with a moving image-bearing member, said apparatus comprising:

a stepper motor that is responsive to stepper motor drive pulses;

a drive member in engagement with the sheet;

a drive coupling connecting the stepper motor and the drive member;

an encoder that generates first clock pulses that correspond with movement of the image-bearing member;

first means for generating first stepper motor drive pulses;

a source of second clock pulses that is connected to the first means, the second clock pulses being generated independently of the first clock pulses;

the first means being connected to the stepper motor and generating first stepper motor drive pulses in response to the second clock pulses for advancing the sheet to a speed approximately the same as the image-bearing member;

means responsive to one of said first stepper motor drive pulses or the first clock pulses for generating a timing control pulse;

means, responsive to occurrence of one of the first clock pulses or the first stepper motor drive pulses during the timing control pulse, for generating a signal; and second means connected to the stepper motor and responsive to said signal for generating second stepper motor drive pulses in response to the first clock pulses for driving the stepper motor to advance the sheet into registered relationship with the image-bearing member.

2. In an electrostatographic apparatus for transferring an image on a moving image-bearing member to a receiver sheet that is driven by a stepper motor; a control means for controlling driving pulses to the stepper motor, said control means comprising:

first means carrying first pulses that are generated so as to be synchronized with movement of the image-bearing member;

second means for generating second pulses for driving the stepper motor, the second pulses being generated so as to be synchronized with said first pulses;

third means for generating third pulses for driving the stepper motor, the third pulses not being synchronized with the first pulses;

fourth means responsive to the first pulses or the third pulses for generating fourth pulses, each having a predetermined pulse duration;

fifth means connected to the fourth means and responsive to occurrence of first pulses and third pulses during the duration of a fourth pulse for generating a signal; and sixth means connected to the fifth means and responsive to said signal for changing drive to said stepper motor from said third pulses to said second pulses to advance a receiver sheet in a first mode wherein stepper mode drive pulses are generated not in synchronization with the movement of the image-bearing member and then advance the receiver sheet into registration with the image-bearing member in a second mode wherein stepper motor drive pulses are generated in synchronization with movement of the image-bearing member.

3. The apparatus of claim 2 and including means for inhibiting operation of said fifth means except during a period subsequent to skew registration of the sheet.

4. The apparatus of claim 2 and including an encoder for generating said first pulses on said first means.

5. A method for advancing a sheet into registered relationship with a moving image-bearing member using a stepper motor that is responsive to stepper motor drive pulses and drives a drive member in engagement with the sheet, said method comprising:

generating first clock pulses that are synchronized with movement of the image-bearing member;

generating first stepper motor drive pulses that are generated independently of the first clock pulses;

driving the stepper motor in response to the first stepper motor drive pulses to advance the sheet to a speed approximately the same as the image-bearing member;

in response to one of said first stepper motor drive pulses or the first clock pulses, generating a timing control pulse;

generating a signal in response to concurrence of at least a portion of one of the first stepper motor drive pulses or a portion of one of the first clock pulses during a timing control pulse;

in response to said signal generating second stepper motor drive pulses in synchronism with the first clock pulses;

driving the stepper motor in response to the second stepper motor drive pulses to advance the sheet into registered relationship with the image-bearing member.

6. A method for advancing a sheet into registered relationship with a moving image-bearing member using a stepper motor that is responsive to stepper motor drive pulses and drives a drive member in engagement with the sheet, said method comprising:

generating clock pulses that correspond with movement of the image-bearing member;

generating first stepper motor drive pulses that are generated independently of the clock pulses for advancing the sheet to a speed approximately the same as the image-bearing member;

in response to concurrence of a first stepper motor drive pulse and an edge portion of one of the clock pulses generating a signal; and in response to said signal and the clock pulses generating second stepper motor drive pulses for driving the stepper motor after the sheet attains said speed to advance the sheet into registered relationship with the image-bearing member.

7. A control for use in advancing a sheet into registered relationship with a moving image-bearing member using a stepper motor that is responsive to stepper motor drive pulses and drives a drive member in engagement with the sheet, said control comprising:

a generator of clock pulses that correspond with movement of the image-bearing member;

a generator of first stepper motor drive pulses that are generated independently of the clock pulses for advancing the sheet to a speed approximately the same as the image-bearing member;

a detector for detecting concurrence of a first stepper motor drive pulse and an edge portion of one of the clock pulses and generating a signal in response to detection of said concurrence; and a generator responsive to said signal and the clock pulses for generating second stepper motor drive pulses for driving the stepper motor after the sheet attains said speed to advance the sheet into registered relationship with the image-bearing member.

* * * * *